United States Patent
Tsirkin et al.

(10) Patent No.: US 11,550,941 B2
(45) Date of Patent: Jan. 10, 2023

(54) SECURE MODULAR DEVICES

(71) Applicant: Red Hat, Inc., Raleigh, NC (US)

(72) Inventors: Michael Tsirkin, Westford, MA (US); Sergio Lopez Pascual, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 316 days.

(21) Appl. No.: 16/863,250

(22) Filed: Apr. 30, 2020

(65) Prior Publication Data
US 2021/0342466 A1   Nov. 4, 2021

(51) Int. Cl.
*G06F 21/62* (2013.01)
*G06F 12/1027* (2016.01)
*G06F 9/455* (2018.01)

(52) U.S. Cl.
CPC ...... *G06F 21/6218* (2013.01); *G06F 9/45558* (2013.01); *G06F 12/1027* (2013.01); *G06F 2009/45583* (2013.01); *G06F 2009/45587* (2013.01)

(58) Field of Classification Search
CPC .... G06F 21/6218; G06F 21/53; G06F 21/606; G06F 9/45558; G06F 12/1027; G06F 2009/45583; G06F 2009/45587; G06F 2212/151; G06F 2212/1052; G06F 12/145
USPC ............................................. 711/6, 203, 154
See application file for complete search history.

(56) References Cited

U.S. PATENT DOCUMENTS

| | | | |
|---|---|---|---|
| 8,893,013 B1* | 11/2014 | Groves | G06F 3/1454 715/740 |
| 9,679,143 B2 | 6/2017 | Desai | |
| 10,140,214 B2 | 11/2018 | Tsirkin et al. | |
| 10,540,294 B2 | 1/2020 | Tsirkin et al. | |
| 2013/0145051 A1* | 6/2013 | Kegel | G06F 13/28 710/9 |
| 2015/0127871 A1* | 5/2015 | Desai | G06F 13/28 710/308 |
| 2017/0104597 A1* | 4/2017 | Negi | H04L 9/0825 |
| 2019/0042463 A1 | 2/2019 | Shanbhogue et al. | |
| 2019/0354387 A1 | 11/2019 | Zhou et al. | |
| 2020/0285494 A1* | 9/2020 | Busaba | G06F 21/606 |

OTHER PUBLICATIONS

Ben-Yehuda et al., "Utilizing IOMMUs for Virtualization in Linux and Xen", http://hypervisorconsulting.com/pubs/iommu/utilizing-iommus-ols06.pdf, Retrieved on or before Feb. 7, 2020, (15 pages).

(Continued)

*Primary Examiner* — Hashem Farrokh
(74) *Attorney, Agent, or Firm* — K&L Gates LLP

(57) ABSTRACT

A system includes a memory and a processor. The memory is in communication with the processor and configured to initialize a secure interface configured to provide access to a virtual machine (VM) from a device, where the VM is associated with a level of security. A buffer is allocated and associated with the secure interface, where the level of security of the VM indicates whether the device has access to guest memory of the VM via the buffer. The buffer is then provided to the device. Inputs/outputs (I/Os) are sent between the device and the VM using the secure interface.

20 Claims, 5 Drawing Sheets

(56) References Cited

OTHER PUBLICATIONS

Li et al., "Exploiting Unprotected I/O Operations in AMD's Secure Encrypted Virtualization", Proceedings of the 28th USENIX Security Symposium, Aug. 14-16, 2019, Santa Clara, CA, USA, (17 pages).
Markuze et al., "True IOMMU Protection from DMA Attacks: When Copy is Faster Than Zero Copy", ASPLOS '16, Apr. 2-6, 2016, Atlanta, Georgia, USA, (14 pages).

* cited by examiner

SECURE MODULAR DEVICES

BACKGROUND

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each guest operating system may be accessed by one or more local or remote clients to perform computing tasks.

SUMMARY

The present disclosure provides new and innovative systems and methods for securely communicating with virtual devices. In an example, a method includes initializing a secure interface configured to provide access to a virtual machine (VM) from a device, where the VM is associated with a level of security. A buffer is allocated and associated with the secure interface. The amount of access to guest memory of the VM is indicated by the level of security. Next, the buffer is provided to the device and inputs/outputs (I/Os) can be sent between the device and the VM using the secure interface.

In an example, a system includes a memory and a processor. The memory is in communication with the processor and configured to initialize a secure interface configured to provide access to a virtual machine (VM) from a device, where the VM is associated with a level of security. A buffer is allocated and associated with the secure interface, where the level of security of the VM indicates whether the device has access to guest memory of the VM via the buffer. The buffer is then provided to the device. Inputs/outputs (I/Os) are sent between the device and the VM using the secure interface.

In an example, a non-transitory machine readable medium storing code, which when executed by a processor, is configured to initialize a secure interface configured to provide access to a virtual machine (VM) from a device, where the VM is associated with a level of security. A buffer is allocated and associated with the secure interface. The level of security of the VM indicates whether the device has access to guest memory of the VM via the buffer. Next, the buffer is provided to the device and inputs/outputs (I/Os) are sent between the device and the VM using the secure interface.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing a variably secure connection between a virtual machine and a device. With the use of virtual machines (VMs) becoming more prominent in industry, it is apparent that there is a need for better security for device communication with a VM. Traditionally, best practice is that devices should be implemented as modular processes with access to only part of a VM's memory. However, typically, updating page tables for all virtual devices for every change is so challenging that many hypervisor actually disable security and map all of guest memory into each device. Generally, a guest OS of a VM needs the ability to reallocate its memory in a flexible way (e.g., moving a device from kernel to user-space control) and, as such, the industry would benefit from innovations that could improve communication with virtual machines.

As described in various examples disclosed herein, to facilitate security when using virtual machines, the systems and methods disclosed herein advantageously providing a device varying levels of access to guest memory of a VM based on an amount of security desired by the VM. In various examples, a VM may have a security level or may rate various devices with different levels of security depending on their source. The VM may vary the amount of access given to a device by deciding whether to use a secure buffer. For example, if a VM determines that a device is trusted or requires a low level of security, the VM will provide access to at least a portion of the guest OS's memory. In some instances, the VM will provide access to all of the guest OS's memory. If a VM determines that a device is not trusted or requires a higher level of security, the VM initializes a software input output translation lookaside buffer (SWIOTLB) and attaches the SWIOTLB to the device memory buffer (e.g., PCI device memory). Next the VM notifies the hypervisor that the VM wants extra security and the hypervisor shares the SWIOTLB with the device process instead of sharing VM memory. In some instances, a hypervisor may set and/or modify permissions of the buffer.

In various examples, a device deemed by a VM to require a high level of security may include, but not limited to, a userspace driver and/or a public storage. A trusted device, or a device requiring a low level of security, may include, but not limited to, trusted manufacturer drivers, trusted data sources, and/or devices known to the VM. In various instances, a low level of security may mean that full access to VM memory is provided. In these instances, a high level of security may mean that one or more security measures are used to protect the VM and VM memory. In some instances, one or more security measures may include using a SWIOTLB instead of providing VM memory.

Figure 1:
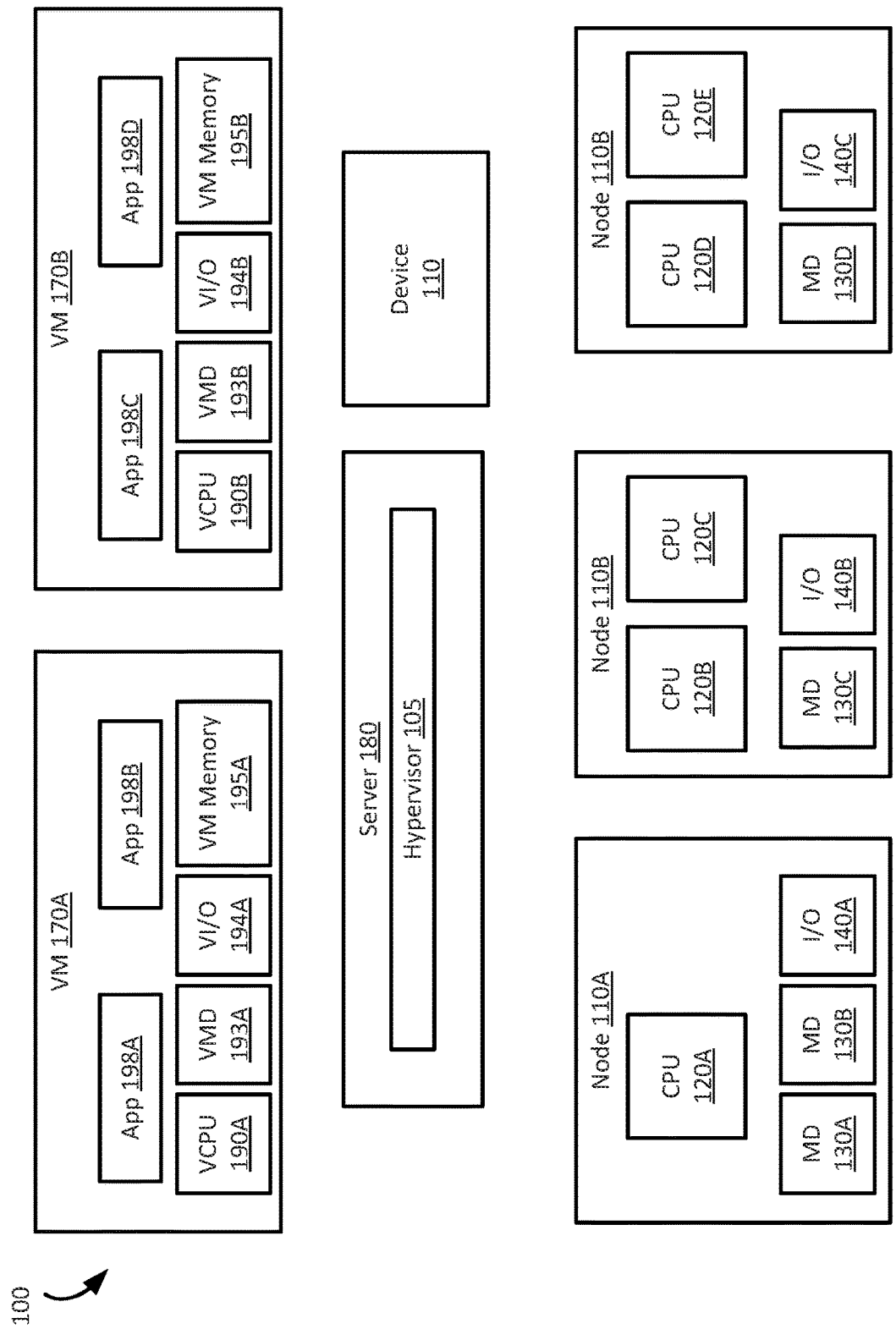
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, a device 110, one or more virtual machines (VM 170A-B, 170 generally), and nodes (e.g., nodes 110A-C, 110 generally). The server 180 may include a hypervisor 105, which may create and/or run the VMs 170.

Virtual machines 170A-B may include a virtual machine memory (VM Memory), a virtual CPU (VCPU), virtual memory devices (VIVID), and virtual input/output devices (VI/O). For example, virtual machine 170A may include virtual machine memory 195A, a virtual CPU 190A, a virtual memory devices 193A, and a virtual input/output device 194A. Similarly, virtual machine 170B may include virtual machine memory 195B, a virtual CPU 190B, a virtual memory devices 193B, and virtual input/output device 194B. In an example, Applications 198A-D may be different applications or services. In another example, applications 198A-D may be different instances of the same application or service.

In an example, a virtual machine 170A may execute a guest operating system and run applications 198A-B which may utilize the underlying VCPU 190A, VIVID 193A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS. In an example embodiment, applications 198A-B run on a virtual machine 170A may be incompatible with the underlying hardware and/or OS. For example, applications 198A-B run on one virtual machine 170A may be compatible with the underlying hardware and/or OS while applications 198C-D run on another virtual machine 170B are incompatible with the underlying hardware and/or OS.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
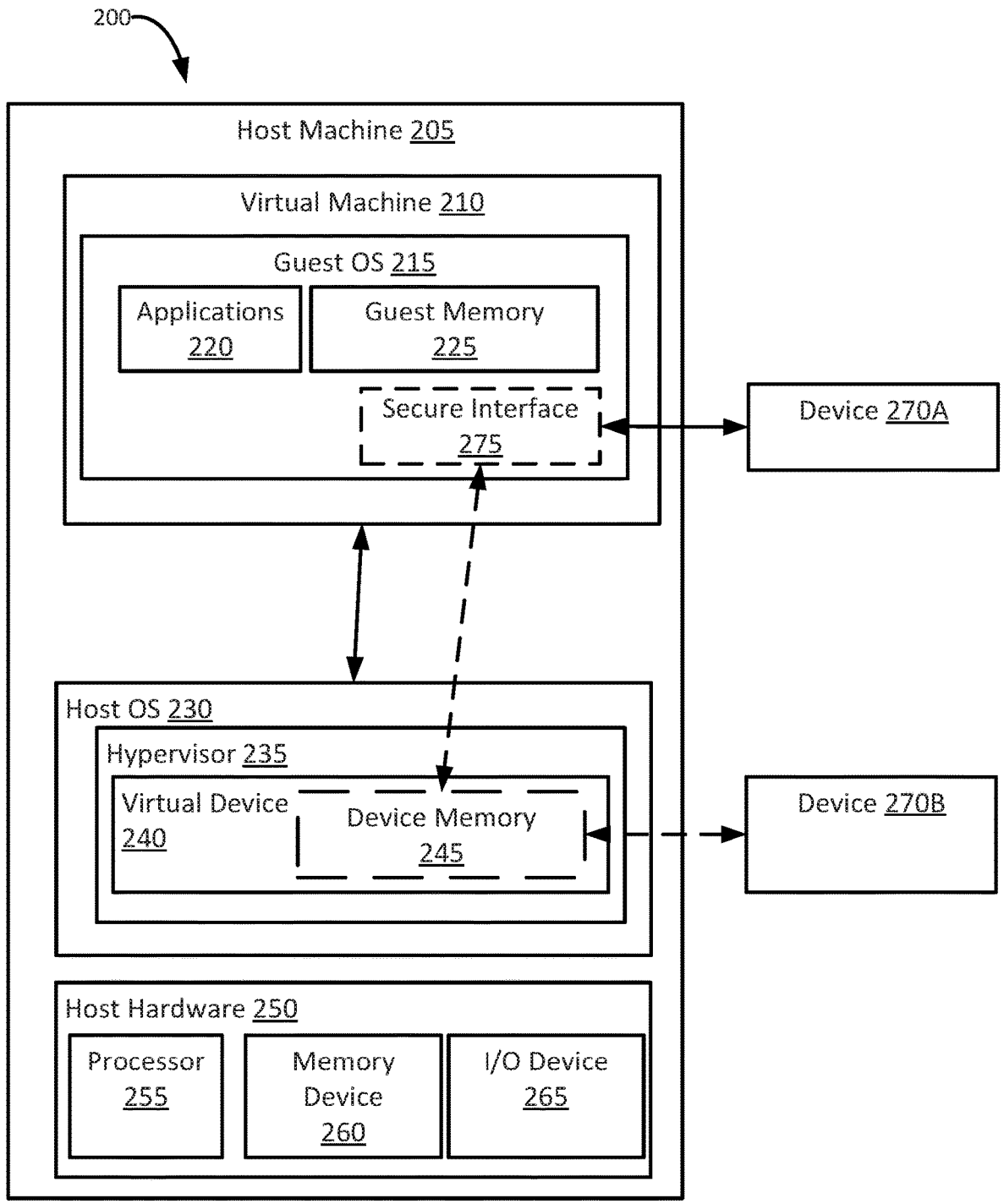
FIG. 2 illustrates a component diagram of an example computing system communicating with a virtual device in accordance with one or more aspects of the present disclosure.

FIG. 2 illustrates a component diagram of an example computing system communicating with a virtual device in accordance with one or more aspects of the present disclosure. As shown, the computer system 200 includes a host machine 205 and devices (270A-B, 270 generally). The host machine 205 includes virtual machine 210, host OS 230, and host hardware 250. The virtual machine 210 includes Guest OS 215, which includes applications 220 and guest memory 225. Host OS 230 includes hypervisor 235, which manages virtual device 240. Host hardware 250 includes processor 255, memory device 260, and I/O device 265. In various examples, device 270 may be a userspace driver. In some examples, device 270 may be a trusted data source. In various examples, the device 270 may be a virtual device.

As shown in FIG. 2, the virtual machine 210 is capable of having secure communication with devices (270A-B, 270 generally). The guest OS 215 may determine whether to request extra security when communicating with a device 270 based on a level of security. For example, device 270A is a trusted device and the VM 210 requires a low level of security when communicating with a trusted device. As such, guest OS 215 initializes a secure interface 275 and allocates a buffer for the device 270A from guest memory 225. Upon providing the buffer to the device 270A, the device 270A, in this instance, has complete access to guest memory 225 through the secure interface 275 during communication between device 270A and virtual machine 210. In some instances, the guest OS 215 is capable of providing only a portion of the guest memory 225 through the secure interface 275. In these instances, a guest OS 215 may limit which portions of guest memory 225 the device 270A can access.

By contrast, guest OS 215 determines that device 270B requires a higher level of security than device 270A. As such, guest OS 215 initializes a secure interface 275 and requests a buffer from hypervisor 235. Hypervisor 235 creates a virtual device 240 that has device memory 245; the device memory 245 is accessible by the guest OS 215 and can appear to be a PCI device. The hypervisor 235 configures the security of the device memory 245 and shares access to the device memory to device 270B. In various instances, configuring security of a buffer may include setting permissions of the buffer. A communication link to the guest OS 215 is created when the device 270B receives access to the device memory 245.

In this configuration, device 270B does not have direct access to guest memory 225 and guest OS 215 has direct control over what is copied into guest memory 225 from the device memory 245. Any information sent by device 270B is first copied into device memory 245. Once guest OS 215 is ready for the information, the information is copied from device memory 245 into guest memory 225. Additionally, any information sent to device 270B from guest OS 215 is first copied into device memory 245 from guest memory 225 and subsequently copied into the memory space of device 270B.

Figure 3:
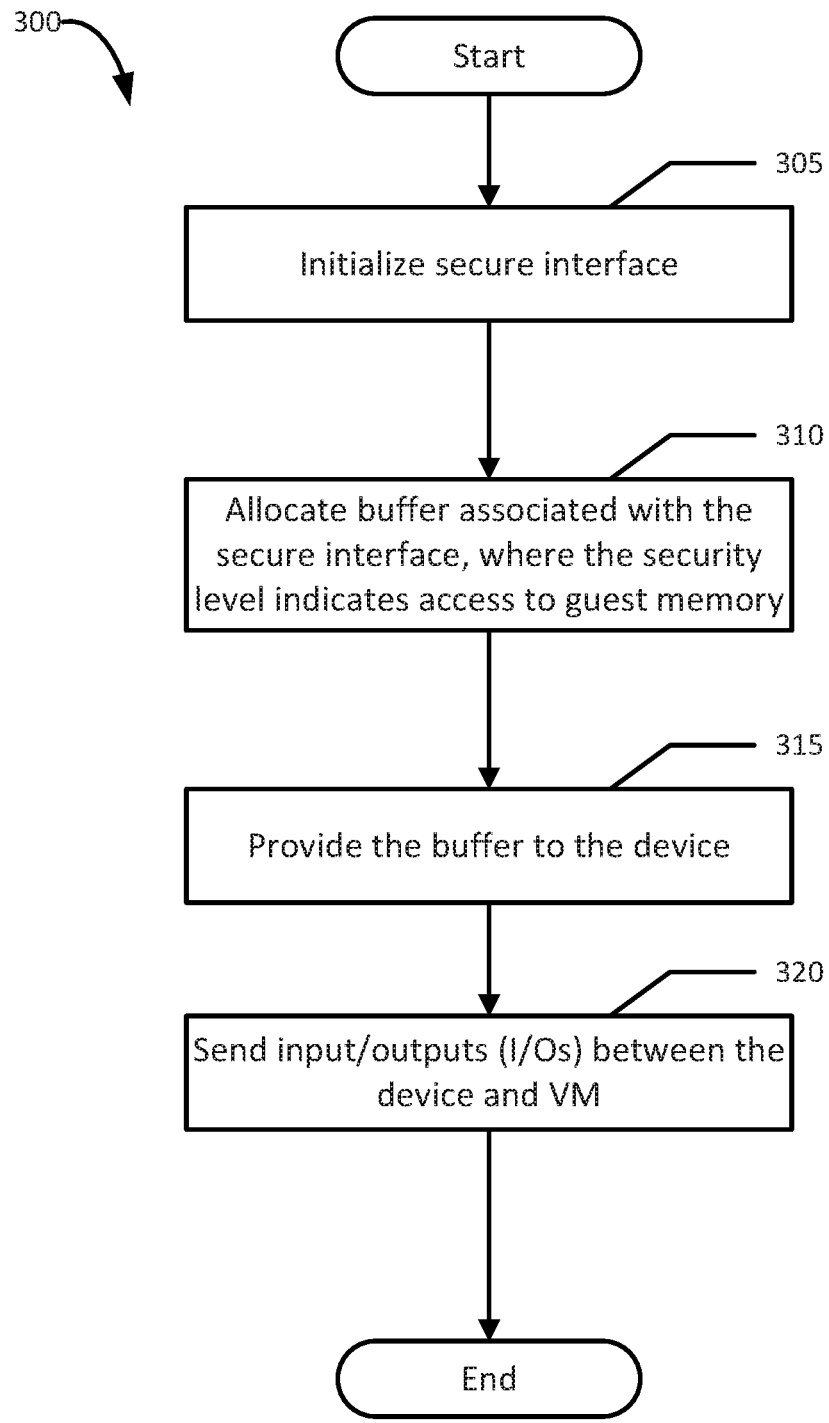
FIG. 3 illustrates a flowchart of an example method of communicating with a device according to an example embodiment of the present disclosure.

FIG. 3 illustrates a flowchart of an example method of communicating with a device, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

As shown, a secure interface is initialized (block 305). For example, a guest OS 215 on virtual machine 210 initializes a secure interface 275 to communicate with a device 270. In various instances, the virtual machine 210 is associated with a level of security. In some instances, the virtual machine 210 may adjust a level of security based on the device wanting to communicate with the virtual machine 210. In this instance, a buffer is allocated and associated with the secure interface, where a level of security indicates an amount of access to guest memory is provided to the device (block 310). For example, upon determining there needs to be a low amount of security between the guest OS 215 and the device 270A, the guest OS allocates a buffer from guest memory 225. If a higher level of security between the guest OS 215 and the device 270B is required, the guest OS 215 requests that the hypervisor 235 create a software input output translation lookaside buffer (SWIOTLB) in the form of device memory 245 at the hypervisor 235. Next, the buffer is provided to the device (block 315). For example, when communicating with device 270A, a buffer from guest memory 225 is provided. When communicating with device 270B, hypervisor 235 provides device memory 245 to device 270B. Upon completing the communication link, inputs/outputs (I/Os) can be sent between the device and VM (block 320). For example, device 270B can send an I/O to guest OS 215 by copying data to device memory 245. Guest OS 215 then retrieves the data from device memory via the secure interface 275.

Figure 4:
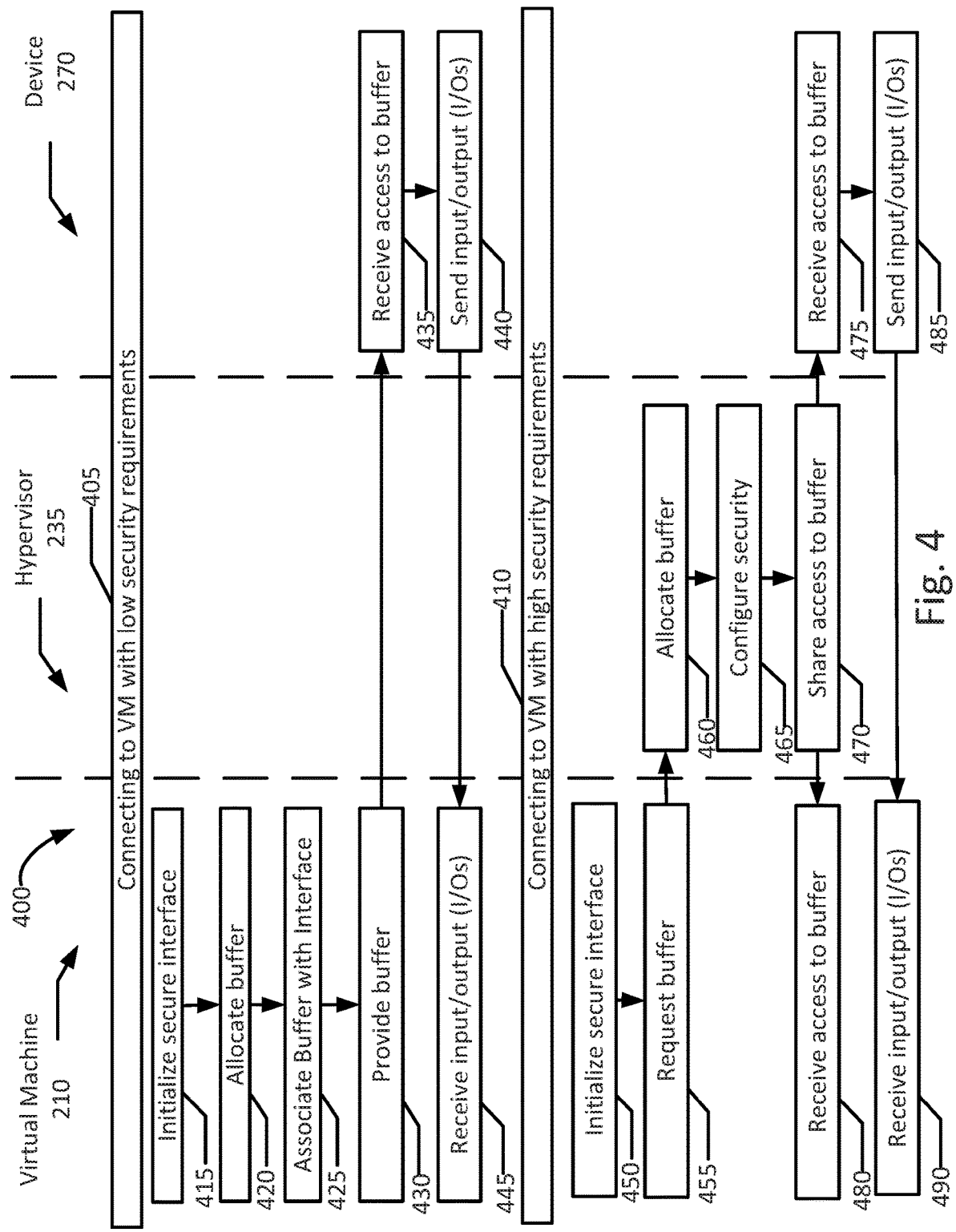
FIG. 4 illustrates a flow diagram of example methods connecting a device to a virtual machine (VM), in accordance with an embodiment of the present disclosure.

FIG. 4 illustrates a flow diagram of an example methods of communicating with a device, in accordance with an embodiment of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. For example, in the illustrated flow diagram, a virtual machine 210 is in communication with a hypervisor 235 when communicating with a device 270, where device 270A requires a low amount of security and device 270B requires a high amount of security.

Connecting to a VM 210 with low security requirements (block 405) may mean that a device 270A is trusted and/or the source of the device 270A is trusted. As shown, a guest OS 215 of VM 210 initializes a secure interface 275 to connect to device 270A (block 415). The guest OS 215 then allocates a buffer from guest memory 225 (block 420) and associates the buffer with the secure interface 275 (block 425). The guest OS 215 provides the buffer to the device 270A (block 430). Upon receiving access to the buffer (block 435), a communication link between the virtual machine 210 and device 270A is complete. At this point, the device 270A can send and receive inputs/outputs (I/Os) (block 440) which can be received by the virtual machine 210 (block (445).

Connecting a VM 210 with device 270B is a different process due to a high amount of security required to secure the VM 210 (block 410) with respect to device 270B. The high level of security may mean that the device 270B is from an uncertain source, not a trusted device, and/or a user-space driver. These types of devices may potentially not be reliable and may potentially cause errors or create security issues when communicating with the VM 210 if allowed full access to guest memory 225. Also, a high level of security may be an attribute of the VM 210, such that the processes running within VM 210 need to be protected from insecure or unreliable devices. In this instance, the VM 210 initializes a secure interface 275 (block 450) and requests a buffer from hypervisor 235 (block 455). The hypervisor 235 creates a virtual device 240 and allocates device memory 245 (block 460) to be a buffer for the secured interface 275. The hypervisor 235 configures security for the device memory 245 (block 465) and shares access to the device memory 245 (block 470) to the VM 215 (block 480) and to the device 270B (block 475). Next, the device 270B can send inputs/outputs (I/Os) (block 485) and VM 210 can receive I/Os (block 490).

Figure 5:
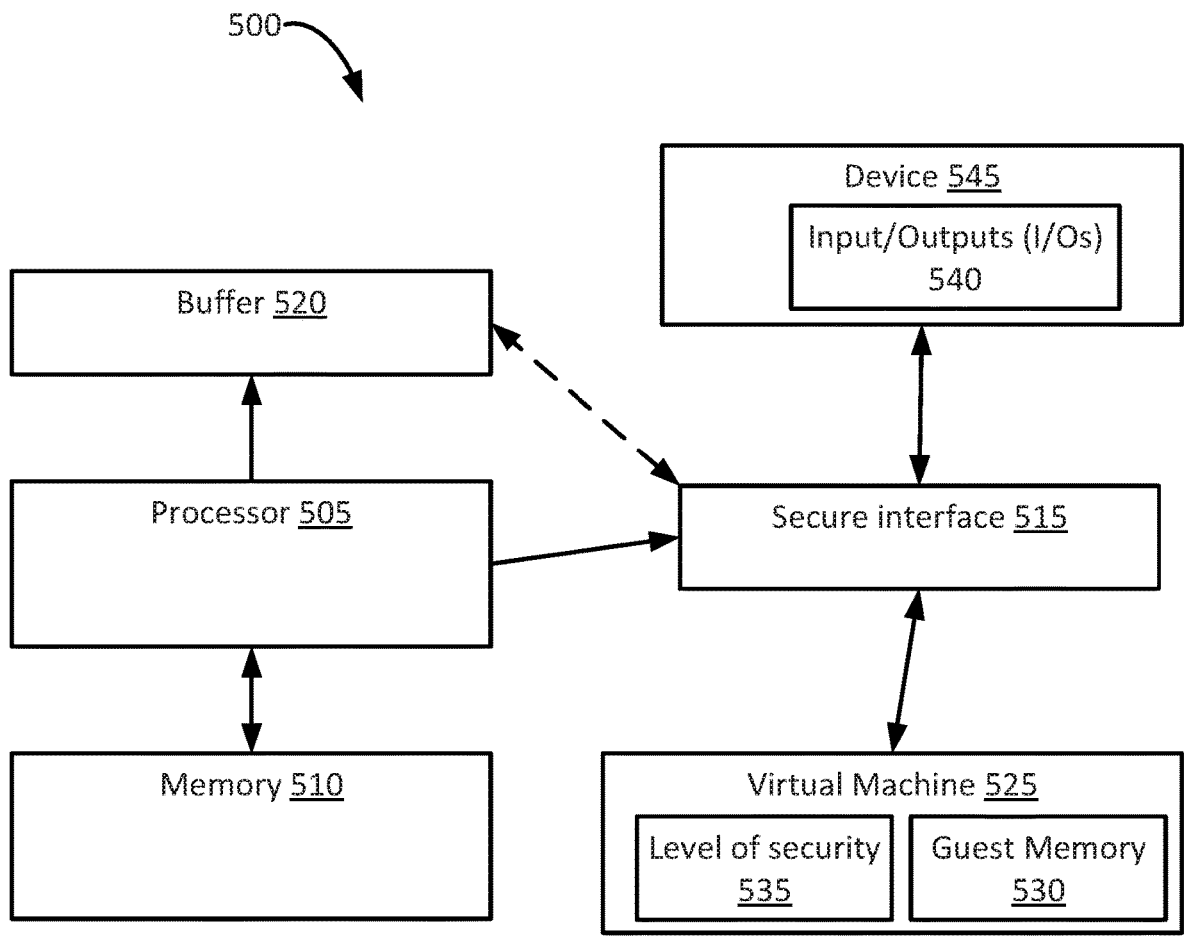
FIG. 5 illustrates a block diagram of an example system communicating with a device according to an example embodiment of the present disclosure.

FIG. 5 is a block diagram of system 500 which includes memory 510 and processor 505. The processor 505 is in communication with the memory 510. The processor 505 initializes a secure interface 515 configured to provide access to a virtual machine 525 from a device 545. The VM 525 is associated with a level of security 535. A buffer 520 is allocated and associated with the secure interface 515. The level of security 535 indicates whether the device 545 has access to guest memory 530 of the VM 525 through the buffer 520. The buffer 520 is then provided to the device 545 and Input/Outputs (I/Os) 540 are sent between the device 545 and the VM 525 using the secure interface 515.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method, comprising:
   initializing a secure interface configured to provide access to a virtual machine (VM) from a device, wherein the VM is associated with a level of security;
   allocating a buffer associated with the secure interface, wherein the level of security indicates whether the device has access to guest memory of the VM via the buffer;
   providing the buffer to the device; and
   sending input/outputs (I/Os) between the device and the VM via the secure interface,
   wherein the buffer is allocated such that at least one of:
      when the level of security of the VM is low, the buffer is allocated from a portion of guest memory of the VM,
      when the device is a trusted device, the buffer is a total amount of guest memory of the VM, or
      when the level of security of the VM is high, the buffer is allocated from host memory.

2. The method of claim 1, wherein the secure interface is a Software Input Output Translation Lookaside Buffer (SWIOTLB).

3. The method of claim 1, wherein, when the level of security of the VM is low, the buffer is allocated from a portion of guest memory of the VM.

4. The method of claim 1, wherein, when the device is a trusted device, the buffer is a total amount of guest memory of the VM.

5. The method of claim 1, wherein, when the level of security of the VM is high, the buffer is allocated from host memory.

6. The method of claim 1, wherein allocating comprises:
   requesting the buffer from a hypervisor, wherein the request includes the level of security;
   allocating, via the hypervisor, the buffer from a portion of host memory; and
   configuring security of the buffer.

7. The method of claim 6, wherein configuring security of the buffer comprises setting permissions of the buffer.

8. A system, comprising:
   a memory; and
   a processor in communication with the memory, wherein the processor is configured to perform:
   initializing a secure interface configured to provide access to a virtual machine (VM) from a device, wherein the VM is associated with a level of security;
   allocating a buffer associated with the secure interface, wherein the level of security indicates whether the device has access to guest memory of the VM via the buffer;
   providing the buffer to the device; and
   sending input/outputs (I/Os) between the device and the VM via the secure interface,
   wherein allocating comprises:
      requesting the buffer from a hypervisor, wherein the request includes the level of security;
      allocating, via the hypervisor, the buffer from a portion of host memory; and
      configuring security of the buffer based on the level of security.

9. The system of claim 8, wherein the secure interface is a Software Input Output Translation Lookaside Buffer (SWIOTLB).

10. The system of claim 8, wherein, when the level of security of the VM is low, the buffer is allocated from a portion of guest memory of the VM.

11. The system of claim 8, wherein the device is a data storage device.

12. The system of claim 8, wherein configuring security of the buffer comprises setting permissions of the buffer.

13. The system of claim 8, wherein the buffer is allocated such that:
   when the level of security of the VM is low, the buffer is allocated from a portion of guest memory of the VM,
   when the device is a trusted device, the buffer is a total amount of guest memory of the VM, and
   when the level of security of the VM is high, the buffer is allocated from host memory.

14. A non-transitory machine readable medium storing code, which when executed by a processor is configured to:
   initialize a secure interface configured to provide access to a virtual machine (VM) from a device, wherein the VM is associated with a level of security;
   allocating a buffer associated with the secure interface, wherein the level of security indicates whether the device has access to guest memory of the VM via the buffer;
   provide the buffer to the device; and
   sending input/outputs (I/Os) between the device and the VM via the secure interface,
   wherein the buffer is allocated such that at least one of:
      when the level of security of the VM is low, the buffer is allocated from a portion of guest memory of the VM,
      when the device is a trusted device, the buffer is a total amount of guest memory of the VM, or
      when the level of security of the VM is high, the buffer is allocated from host memory.

15. The non-transitory machine readable medium of claim 14, wherein the secure interface is a Software Input Output Translation Lookaside Buffer (SWIOTLB).

16. The non-transitory machine readable medium of claim 14, wherein, when the level of security of the VM is low, the buffer is allocated from a portion of guest memory of the VM.

17. The non-transitory machine readable medium of claim 14, wherein, when the device is a trusted device, the buffer is a total amount of guest memory of the VM.

18. The non-transitory machine readable medium of claim 14, wherein, when the level of security of the VM is high, the buffer is allocated from host memory.

19. The non-transitory machine readable medium of claim 14, wherein allocating comprises:
   requesting the buffer from a hypervisor, wherein the request includes the level of security;
   allocating, via the hypervisor, the buffer from a portion of host memory; and
   configuring security of the buffer.

20. The non-transitory machine readable medium of claim 19, wherein configuring security of the buffer comprises setting permissions of the buffer.

* * * * *